Figure 1:
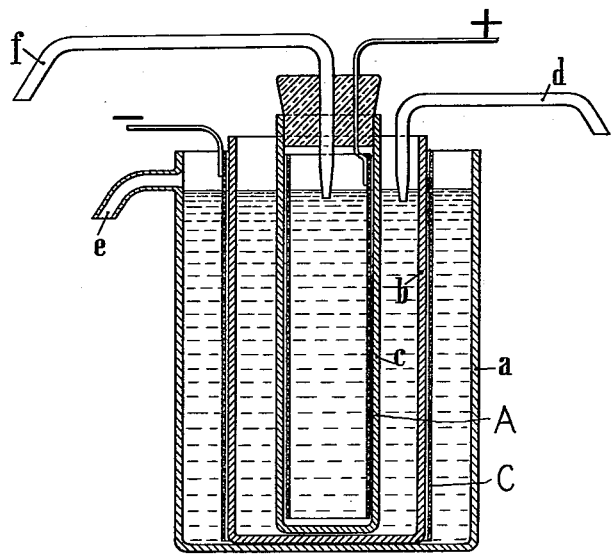

B. SCHWERIN.
PROCESS OF TREATING COLLOIDAL AND FINELY SUBDIVIDED SUBSTANCES.
APPLICATION FILED JUNE 19, 1912. RENEWED OCT. 28, 1919.

1,326,106. Patented Dec. 23, 1919.

Witnesses:

Inventor:
Botho Schwerin

UNITED STATES PATENT OFFICE.

BOTHO SCHWERIN, OF FRANKFORT-ON-THE-MAIN, GERMANY, ASSIGNOR TO GESELLSCHAFT FÜR ELEKTRO-OSMOSE M. B. H., OF FRANKFORT-ON-THE-MAIN, GERMANY, A CORPORATION.

PROCESS OF TREATING COLLOIDAL AND FINELY-SUBDIVIDED SUBSTANCES.

1,326,106.          Specification of Letters Patent.      Patented Dec. 23, 1919.

Application filed June 19, 1912, Serial No. 704,475. Renewed October 28, 1919. Serial No. 334,037.

*To all whom it may concern:*

Be it known that I, BOTHO SCHWERIN, residing at Frankfort-on-the-Main, Germany, have invented certain new and useful Improvements in Processes of Treating Colloidal and Finely-Subdivided Substances, of which the following is a specification.

It is a well-known fact that adsorbed substances are mostly very tightly bound with the surfaces of the finest particles which serve them as bearers, so that they seem as if chemically joined, and are often taken to be such. For example, colloidal iron hydroxid is bound so fast with clay that it has been possible to separate only by chemical treatment the one from the other. Colloidal solution of platinum or gold is so fast adsorbed by finely subdivided carborundum and clay that it can be separated from carborundum neither with acids nor bases, except only through treatment with aqua regia, which dissolves platinum.

On this account it has up to now only been possible to separate colloidal or soluble substances or suspended bodies in a colloidal state from their bases through chemical media. By this chemical action the substance is naturally also chemically changed; moreover through the action of the chemical agent the substance also obtains a new adsorption, therefore the following invention opens up a new way for separating adsorbed substances from one another, whereby the character of the components is preserved and the same undergo no chemical change. Furthermore, one can obtain through the use of diaphragms of different porosity fractions of a different size of grain. The invention consists in separating the adsorbed bodies from their bases and vice versa, by means of electro-osmosis.

The new process makes it possible either to free finely subdivided substances from adsorptions that are not wanted, *i. e.*, to clean the substances or to separate and acquire the adsorbed bodies,—which is frequently of great importance (for instance, in serum therapy). The present invention, therefore, enables one to separate adsorbed colloidal iron-hydroxid from clay, and so, clean the clay. Or it makes it possible, for instance, to divide the before-mentioned colloidal gold or platinum from the carborundum which hold it adsorbed, and so acquire it. The process is further of immense importance in the treatment of albuminoids, and so for serum-therapy. This new process enables one not only to free the albuminoids of the adsorbtions, but also to separate the various substances from each other.

The apparatus necessary for the application of the process consists principally (1) of a vessel to contain the slime or whatever matter it is wished to treat, and which may serve as one electrode, (2) a second electrode, one or both of which may still be surrounded by diaphragms.

Figure 2:
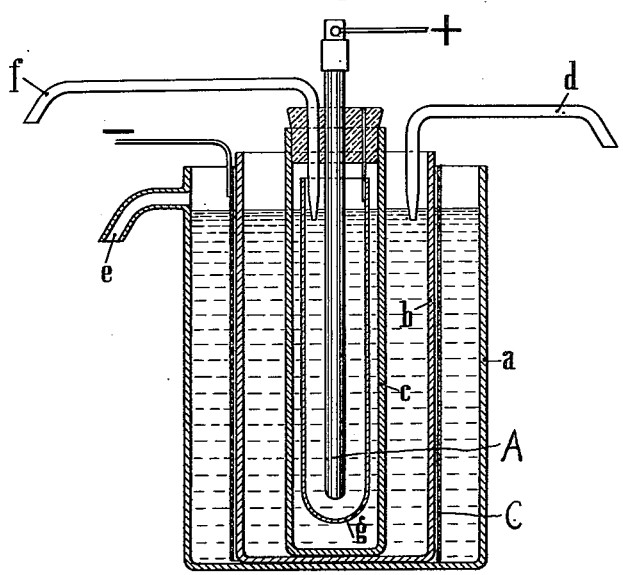

Referring to the drawing forming a part of this application, Figure 1 is a sectional view through one form of my invention and Fig. 2 is a similar view of a slightly modified form.

In a tumbler (*a*) is a diaphragm (*b*) of electro-negative material, for instance, burnt out of finely divided silicic acid, around which a wire net is tightly fitted, and serves as cathode C. Into this diaphragm (*b*) is placed a second diaphragm (*c*) of smaller diameter, so that between these two diaphragms there remains some space; this diaphragm (*c*) consists of electropositive material, for instance, burnt out of finely divided oxid of aluminium or of the finest separated corundum. The positive pole A is placed against the interior side of diaphragm (*c*), which may be of platinum-wire-net, carbon, etc.

The adsorbed body may have a potential unequal to the colloidal body, and the latter may deposit itself in solid form on one of the electrodes or on one of the partitions placed before it. As a rule, you will find the adsorbed body in the liquid. If the adsorbed body is a real colloid or a soluble substance it may be passed through a diaphragm and so be isolated from the space containing the substance itself from which it is to be separated.

The adsorption may also consist of colloids similar as to sign but differing in the degree of strength of the charge. Because of the similarity of the charge, these substances will all move toward the same pole, but owing to the difference in strength will deposit fractionally. In the treatment of a slime containing, for instance, a certain kind of clay which has adsorbed "Berlin-blue", both substances are electro-negative, but the "Berlin-blue" is of greater strength than the clay. In the process, according to the present invention the first named substance deposits directly on the electrode, whereas the clay deposits on top of it. Hereby the clay acts partly as a diaphragm through which the in-coming particles of the "Berlin-blue" force their way. As a rule, the adsorbed substance in suspended colloidal matter is a real colloidal substance or even soluble in the liquid in question. In such a case, one can make the separation an ideal one in a manner similar to that above-mentioned, by passing the adsorbed colloidal bodies through a diaphragm placed before the pole toward which both substances move. One may further obtain fractions of various degrees of porosity. In this way, it is possible to obtain, for instance, from albumens which have adsorbed different substances, the separation of the same into different deposits. The diaphragm placed before the pole must either be indifferent or of the same sign of potential as the pole. It may happen that the discharge of the ions at the pole may dissolve or disintegrate the substance to be separated. In order to avoid this, a second diaphragm may advantageously be placed in front the pole, and the substance be obtained in the space between the two diaphragms.

In later times, one has succeeded by various processes in dividing up into very fine particles metals, such as: platinum, gold, silver, wolfram, vanadium, tantalum; or metalloids such as: silicon, or carbids, as: carbid of boron or carborundum, through mechanical, chemical, or combined action, or through electrical pulverization, so that the bodies change into so called colloidal condition. In this condition, the substances have been used in many various ways, inasmuch as they may be, owing to their plasticity, formed, pressed, or even drawn into wire, and through creation of the sol-condition may even be cast. These substances in colloidal form in addition show the surprising characteristic, that they can be burnt to solid bodies.

The valuable characteristics of colloidal bodies are very much injured through the fact, that one has not succeeded in keeping them free from adsorptions. For it is just the colloidal state that offers through its large surface the possibility of adsorbing foreign admixtures, so that these substances could not be prepared in a pure state by the process hitherto used. The further practical use very often depends on its purity. It is very well known that the characteristics of metals especially are greatly injured by traces of impurities.

But if the present invention is used as circumstances may demand either in the manner described in experiment 1 or 2, colloidal metals can be freed from the injurious impurities.

*Experiment 1.—The separation of electrolytes from a colloid.*

It is a well-known fact, that finely subdivided bodies, for instance amorphous silicic acids, chemically produced, retain with greatest pertinacity adsorbed salts such as sulfate of sodium, or chlorid of sodium resulting from their production, so that they can be in no way removed. Through the electro-osmosis according to the present process these impurities can be removed in a simple and profitable manner.

At the beginning of the process the tumbler and the the inner diaphragm are filled with distilled water, whereas the slime of the finely distributed silicic-acid-hydrogel as it is produced by the chemical precipitation and washing out, is allowed to run into the middle space through the conveyer "$d$". The current being closed the separation takes place as follows:

The silicic-acid-hydrogel passes as electro-negative substance toward the anode and deposits itself under these circumstances as a solid layer on the anodical diaphragm. The basic residues dissolved by the silicic acid pass toward the cathode through the diaphragms. Simultaneously water is transported by means of the electric current through the cathodic diaphragm into the cathodic space and flows out of the tumbler through the conveyer "$e$". The residues of acid on the other hand are also separated from the silicic-acid and pass through the electropositive diaphragms toward the anode. Through the cataphorical action of the current, water is also transported into the anodic cell and flows out through the conveyer "$f$". The cataphorical transport of water is strong enough, that the impure silicic acid hydrogel suspended in water can flow incessantly through the conveyer "$d$".

Before the process is finished, the flow of water in which is suspended impure silicic acid hydrogel is stopped and distilled water is permitted to flow through the conveyer "$d$", whereby the last impurities remaining in the deposit on the anodic diaphragm, are removed through the action of electric current. The anodic diaphragm can then be taken out and the deposit of silicic acid removed, which is then free from adsorptions and yields, treated with hydrofluoric acid, no residuum.

The consumption of electric current varies, according to the impurity of the material to be treated. It amounts for instance to 1 ampere with 100 volts. with a cathode surface of 2 square decimeters. The deposited amount of amorphous silicid-acid of 40% dry substance amounted to 100 grams in 5 minutes.

*Experiment 2.—The separation of adsorbed colloidal bodies.*

When kaolin is treated with colloidal iron hydroxid solution and Berlin-blue-solution, the colloidal iron-hydroxid as well as the Berlin-blue-solution will be adsorbed by the kaolin and the bodies cannot be separated from each other without the substances being damaged or changed by the chemicals used.

The process is the same as in experiment 1. The slime of the kaolin which has adsorbed the above-mentioned bodies flows to the middle-space through the pipe "*d*" between diaphragms "*b*" and "*c*". Under the influence of the difference of potential, the electro-positive colloidal iron hydroxid separates itself from the kaolin, and passes with the cataphorically transported water through the diaphragm "*b*" if the finest pores of the latter are big enough to permit the passage of the iron hydroxid particles. The latter deposits in gel-state in the cathode space between "*a*" and "*b*". The kaolin and the Berlin-blue pass under the influence of potential togther toward the anode, and settle on the anodical diaphragm. The Berlin-blue has a stronger electronegative charge than the kaolin and passes more rapidly toward the anode.

On this account the Berlin-blue will be deposited nearest to the anodic diaphragm, the kaolin being deposited in a layer on the Berlin-blue. The Berlin-blue can even migrate through the anodic diaphragm provided that the porosity of the used diaphragms permits the passage of the particles of Berlin-blue. Such a diaphragm may be made out of aluminium-oxid. In this way the Berlin-blue may be also obtained separately from the kaolin, but in order to prevent decomposition by the chemical action of the electric current at the anode, it is necessary to place a second diaphragm of an indifferent character, for instance parchment, in front of the anode. With this arrangement the Berlin-blue is deposited on the second indifferent diaphragm of parchment "*g*", Fig. 2. By this process the components are obtained each separately, the iron hydroxid in the space between "*a*" and "*b*", the kaolin, between "*b*" and "*c*", the Berlin-blue between "*c*" and "*g*" Fig. 2.

The consumption of current and the duration of time depends on the nature of the material to be treated. In an experiment with two square decimeters of cathodical surface the current consumption amounted to from 0,5 to 1 ampere with from 100 to 200 volts, and the process of separation of the substances was finished in about 5 or 10 minutes.

The purpose of making the diaphragm *b* of electro negative material and the diaphragm *c* of electro positive material may be set forth as follows:

As the diaphragms *b* and *c* are interposed between the anode and cathode, it is desired that these diaphragms be of materials of different electro-chemical nature, in that the diaphragms in proximity to the cathode should be electro-negative while the diaphragm in proximity to the anode should be electro-positive. As the diaphragms serve to collect the adsorbed substances, and as the operation may be continuous, it is necessary that these diaphragms should present the greatest surfaces for accumulation thereon.

These diaphragms also control the fractional separation of the adsorbed substances through the different degrees of porosity of the said cells or diaphragms.

In continuous operation, the substance to be treated is delivered between the diaphragms *b* and *c* as through the duct *d*. Electrical treatment causes the separation of the molecules of the substance and those having the affinities of the electrodes, move toward the said electrodes. The accumulation of substance in the space between the diaphragms *b* and the cell *a* causes an overflow through the outlet *e*, and the accumulation within the cell *c*, through the presence of a closure for said cell, is discharged through the duct *f*.

In Fig. 2, the part *g* is the diaphragm, the object of which is to prevent the dissociation of any colloids which have gone into the anode.

Having thus described my invention, I claim as new and desire to secure by Letters Patent:

1. A process for treating colloidal, soluble or finely subdivided matter for the purpose of separating the adsorbed components from the adsorbing components, which consists in subjecting colloidal, soluble, or finely subdivided matter dispersed in a suitable medium to electro-osmosis by arranging electrodes in spaced concentric diaphragms, and introducing the matter therebetween, whereby the adsorbed and adsorbing components separate and migrate toward the electrodes.

2. A process for treating colloidal, soluble or finely subdivided matter for the purpose of separating the adsorbed components from the adsorbing components which consists in subjecting colloidal, soluble, or finely subdivided matter dispersed in a suitable medium within a space having inner and outer concentric diaphragms having electrodes to electro-osmosis, whereby the adsorbed and the adsorbing components separate and migrate through diaphragms of selected materials, said electrodes being immersed in baths of different characteristic from said matter.

3. A process for treating colloidal, soluble or finely subdivided matter for the purpose of separating the adsorbed components from the adsorbing components which consists in subjecting colloidal, soluble, or finely subdivided matter dispersed in a suitable medium to electro-osmosis, whereby the adsorbed and the adsorbing components separate and migrate through inner and outer diaphragms of selected porosity, and having concentric electrodes.

4. A process for treating colloidal, soluble or finely subdivided matter for the purpose of separating the adsorbing components from the adsorbing components which consists in subjecting colloidal, soluble, or finely subdivided matter dispersed in a suitable medium to electro-osmosis whereby the adsorbed and the adsorbing components separate and migrate through diaphragms of selected materials and selected porosity, and having a central anode and an outer concentric cathode, and preventing decomposition of the former by a surrounding diaphragm.

In testimony whereof I affix my signature in presence of two witnesses.

BOTHO SCHWERIN.

Witnesses:
JEAN GRUND,
CARL GRUND.